US007657892B2

(12) United States Patent
Langen et al.

(10) Patent No.: US 7,657,892 B2
(45) Date of Patent: Feb. 2, 2010

(54) SYSTEM AND METHOD FOR APPLICATION SERVER WITH SELF-TUNED THREADING MODEL

(75) Inventors: Anno Langen, Berkeley, CA (US); Naresh Revanuru, Fremont, CA (US)

(73) Assignee: BEA Systems, Inc., Redwood Shores, CA (US)

( * ) Notice: Subject to any disclaimer, the term of this patent is extended or adjusted under 35 U.S.C. 154(b) by 602 days.

(21) Appl. No.: 11/132,601

(22) Filed: May 19, 2005

(65) Prior Publication Data

US 2005/0262507 A1 Nov. 24, 2005

Related U.S. Application Data

(60) Provisional application No. 60/572,938, filed on May 20, 2004.

(51) Int. Cl.
G06F 9/50 (2006.01)
G06F 9/48 (2006.01)
(52) U.S. Cl. ........................................ 718/102; 718/104
(58) Field of Classification Search ................ 719/314; 718/100, 103, 104, 102
See application file for complete search history.

(56) References Cited

U.S. PATENT DOCUMENTS

| 6,237,073 | B1 | 5/2001 | Dean et al. | |
|---|---|---|---|---|
| 6,304,906 | B1 | 10/2001 | Bhatti et al. | |
| 6,549,930 | B1 | 4/2003 | Chrysos et al. | |
| 6,675,190 | B1 | 1/2004 | Schabernack et al. | |
| 2003/0093499 | A1 | 5/2003 | Messinger et al. | |
| 2003/0208521 | A1 | 11/2003 | Brenner et al. | |
| 2003/0236815 | A1 | 12/2003 | Brenner et al. | |
| 2004/0015974 | A1 | 1/2004 | Jeyaraman | |
| 2005/0066326 | A1* | 3/2005 | Herbeck et al. | 718/100 |
| 2005/0183084 | A1* | 8/2005 | Cuomo et al. | 718/100 |

FOREIGN PATENT DOCUMENTS

| EP | 0935194 A2 | 11/1999 |
|---|---|---|
| WO | WO 02/088938 A1 | 11/2002 |

OTHER PUBLICATIONS

PCT International Search Report re: PCT Application No. PCT/US05/17744 dated Feb. 6, 2007 (10 pages).
Supplementary European Search Report for EP05753245, 3 pages.
Supplementary European Search Report for EP05753245, 3 pages, Jun. 10, 2008.

* cited by examiner

*Primary Examiner*—Li B Zhen
(74) *Attorney, Agent, or Firm*—Fliesler Meyer LLP

(57) ABSTRACT

A system and method for application server with self-tuned threading model. A server queue is used as a priority scheme, including a number of entries therein associated with received requests, and which allows the entries to have expressed priorities or share values, instead of simply the number of threads. Flexibility is retained to express the threads in raw numbers whenever this might be desired, or to express constraints on the number of threads to be made available.

21 Claims, 3 Drawing Sheets

SYSTEM AND METHOD FOR APPLICATION SERVER WITH SELF-TUNED THREADING MODEL

CLAIM OF PRIORITY

This application claims priority from provisional application entitled SYSTEM AND METHOD FOR APPLICATION SERVER WITH SELF-TUNED THREADING MODEL, Application No. 60/572,938, filed May 20, 2004, by Anno Langen and Naresh Revanuru, and incorporated herein by reference.

FIELD OF THE INVENTION

The invention is related generally to application servers and messaging systems, and specifically to a system and method for application server with self-tuned threading model.

BACKGROUND

In a typical application server or web server environment, where there exists perhaps many hundreds or thousands of concurrent users (clients), each of these clients can send requests to the server. FIG. 1 shows an example of such an environment. A modern server 100 may have many processors, and many threads 102 servicing those processors. The threads take requests 110, 112, 114 from the clients 104, 106, 108, and apply them to the processors in a queue-like fashion. The actual number of threads used has a big impact on the performance of the server, and its ability to handle large numbers of users. However, figuring out the optimal number of threads is a complicated process.

One approach to this problem has been to add even more threads, so that the number of threads greatly exceeds the number of processors. This ensures that requests are almost immediately fed into threads, but doesn't ensure that those requests are quickly taken up by the processors. A more recent alternative has been to create thread pools, with a flexible number of threads operating within. The actual number of threads can then be fine-tuned by an administrator to provide the best performance for a particular runtime environment. However, this process is heavily dependent on the skill of the administrator, and, since it is largely environment-dependent and static, is of most use only for test-benching and marketing purposes. In real-life situations, the environments are so varied that this static approach is not satisfactory.

Accordingly, what is needed is a means for allowing a server to automatically determine and implement the optimal number of concurrent threads based on objective predictions for the workload. Because of the limitations of where an application server sits (above the operating system) this thread control cannot be embedded within the operating system, but must be able to exist at a higher level. Accordingly there should be a means for controlling the number of the threads in the application server, and the queues that feed them.

SUMMARY

In accordance with an embodiment of the invention a system and method for application server with self-tuned threading model is provided. In accordance with an embodiment a server queue is used as a priority scheme, including a number of entries therein associated with received requests, and which allows the entries to have expressed priorities that are more natural and closer to the business users than simply the number of threads. Flexibility is still retained to express the threads in raw numbers where this might be desired (for example if there is a known calling sequence that would deadlock unless a specific number of threads were made available), or to express constraints on the number of threads to be made available on a system-wide or workload-basis.

In accordance with an embodiment, priorities may be specified as a "share", an abstract notion which reflects the proportional priority between entities that will receive the requests. Since the total number is arbitrary and there may perhaps be more than 100 shares, the shares are not identical to percentage thread-use, although they are similar. Shares determine the thread usage (in terms of thread number) allocated to each entity. The system (or algorithm operating thereon) then ensures that, over the longer term, the use of the threads (in terms of thread time) will be distributed according to those shares. Any entity who, for example, uses twice as much time or thread minutes as they had been allocated will then be penalized to bring the relative usage proportion back into balance.

In accordance with an embodiment, during runtime the algorithm can also be used to size the thread pool and then allocate the thread within that pool.

In accordance with an embodiment, a priority queue is maintained. Each requesting entity, for example a client, can issue requests that go into the queue, and that are spaced apart according to the relative shares. So, for example, if an entity has not exceeded its allocation then its requests can be placed relatively high up in the queue, and will start getting threads immediately, compared to another entity who had used up their allocation or has a lower time-based allocation or share.

In accordance with an embodiment, for a maximum thread constraint the system can maintain a separate queue for holding a request in the priority queue and also in the maximum thread constraint queue. When the maximum thread constraint queue is cleared any similar item in the priority queue (i.e. something for the same constraint) will be allowed to execute.

In accordance with an embodiment, the sizing of the thread pool can be distilled down to an increment or a decrement by one of the existing pool. This is performed on a periodic basis, for example every one or two seconds.

The overall result of the self-tuned threading model is a dramatic improvement of the server in out-of-the box performance. The thread characteristics can then be further tailored to suit specific needs. This feature also allows the server customer to have more flexibility in the setup of their system and provides them with ways to prioritize their threading model for a specific business logic, or set of customer needs etc.

DETAILED DESCRIPTION

Figure 1:
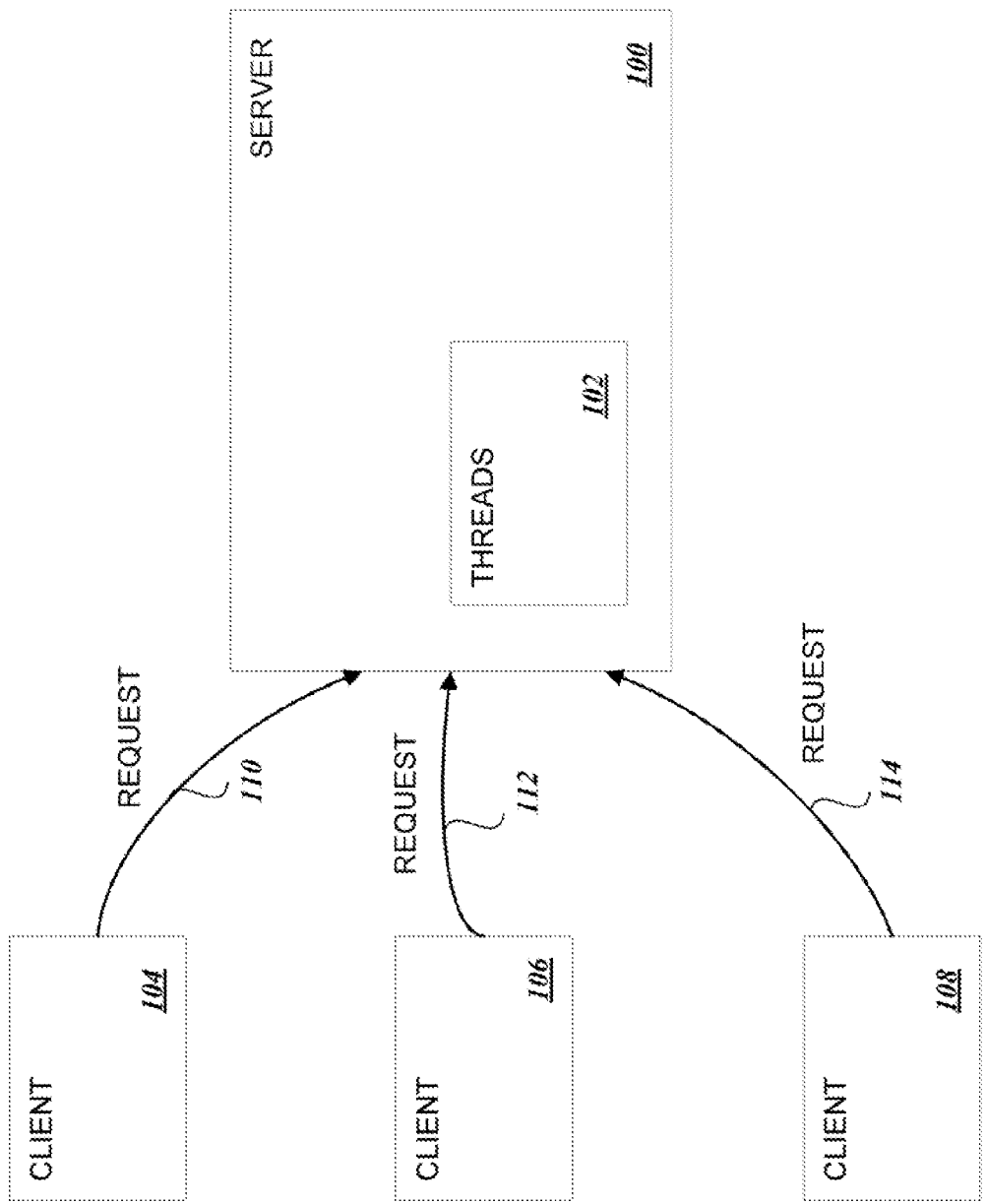
FIG. 1 shows an illustration of an environment in which multiple clients access a server using threads.

Presently, application server customers define new thread pools and configure their size to avoid deadlocks and provide differentiated service. This is quite a difficult process. A talented software administration team may spend several days puzzling out a configuration for optimal performance.

In accordance with an embodiment of the present invention, a self-tuned server dynamically adjusts the number of threads to avoid deadlocks and achieve optimal throughput subject to concurrency constraints. It also meets objectives for differentiated service. These objectives are stated as response time goals, shares, and priorities.

In accordance with an embodiment, the system addresses requirements related to workload management, execute queue clean-up, thread count tuning, and overload protection. The numerous execute queues in the server can be collapsed into a single, priority-based queue. The system implements a priority based work scheduling scheme, where high priority work spends less time in the queue. Scheduling takes into account resource constraints. The primary focus is to make the scheduling model scalable and enable administrators to specify workload management rules.

In accordance with an embodiment of the invention, a system and method for application server with self-tuned threading model is provided. In accordance with an embodiment a server queue is used as a priority scheme, including a number of entries therein associated with received requests, and which allows the entries to have expressed priorities that are more natural and closer to the business users than simply the number of threads. Flexibility is still retained to express the threads in raw numbers where this might be desired (for example if there is a known calling sequence that would deadlock unless a specific number of threads were made available), or to express constraints on the number of threads to be made available on a system-wide or workload-basis.

In accordance with an embodiment, priorities may be specified as a "share", an abstract notion which reflects the proportional priority between entities that will receive the requests. Since the total number is arbitrary and there may perhaps be more than 100 shares, the shares are not identical to percentage thread-use, although they are similar. Shares determine the thread usage (in terms of thread number) allocated to each entity. The system (or algorithm operating thereon) then ensures that, over the longer term, the use of the threads (in terms of thread time) will be distributed according to those shares. Any entity who, for example, uses twice as much time or thread minutes as they had been allocated will then be penalized to bring the relative usage proportion back into balance.

In accordance with an embodiment, during runtime the algorithm can also be used to size the thread pool and then allocate the thread within that pool.

In accordance with an embodiment, a priority queue is maintained. Each requesting entity, for example a client, can issue requests that go into the queue, and that are spaced apart according to the relative shares. So for example if an entity has not exceeded its allocation its requests can be placed relatively high up in the queue, and will start getting threads immediately, compared to another entity who had used up their allocation or has a lower time-based allocation or share.

In accordance with an embodiment, for a maximum thread constraint the system can maintain a separate queue for holding a request in the priority queue and also in the maximum thread constraint queue. When the maximum thread constraint queue is cleared any similar item in the priority queue (i.e. something for the same constraint) will be allowed to execute.

In accordance with an embodiment, the sizing of the thread pool can be distilled down to an increment or a decrement by one of the existing pool. This is performed on a periodic basis, for example every one or two seconds.

The overall result of the self-tuned threading model is a dramatic improvement of the server in out-of-the box performance. The thread characteristics can then be further tailored to suit specific needs. This feature also allows the server customer to have more flexibility in the setup of their system and provides them with ways to prioritize their threading model for a specific business logic, or set of customer needs etc.

Figure 2:
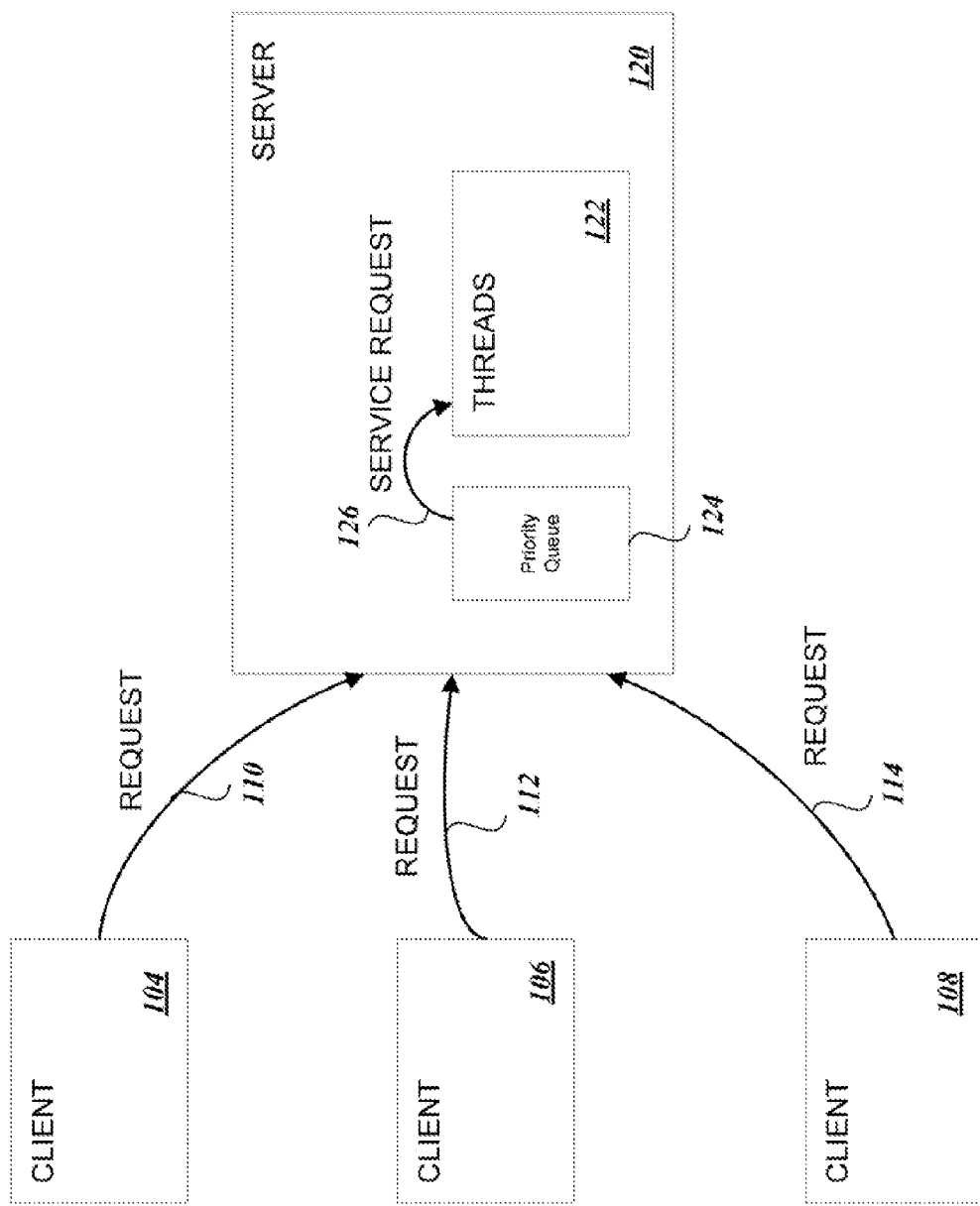
FIG. 2 shows an illustration of an environment in which multiple clients access a server using threads and a priority queue, in accordance with an embodiment of the invention.

FIG. 2 shows an illustration of an environment in which multiple clients access a server using threads and a priority queue, in accordance with an embodiment of the invention. As shown in FIG. 2, a server 120 may have many processors, and many threads 122 servicing those processors. A priority queue 124 takes requests 110, 112, 114 from the clients 104, 106, 108, and queues the entries, prioritizing them according to any pre-configured share value or constraints, before passing them 126 to the threads which then apply them to the processors.

Figure 3:
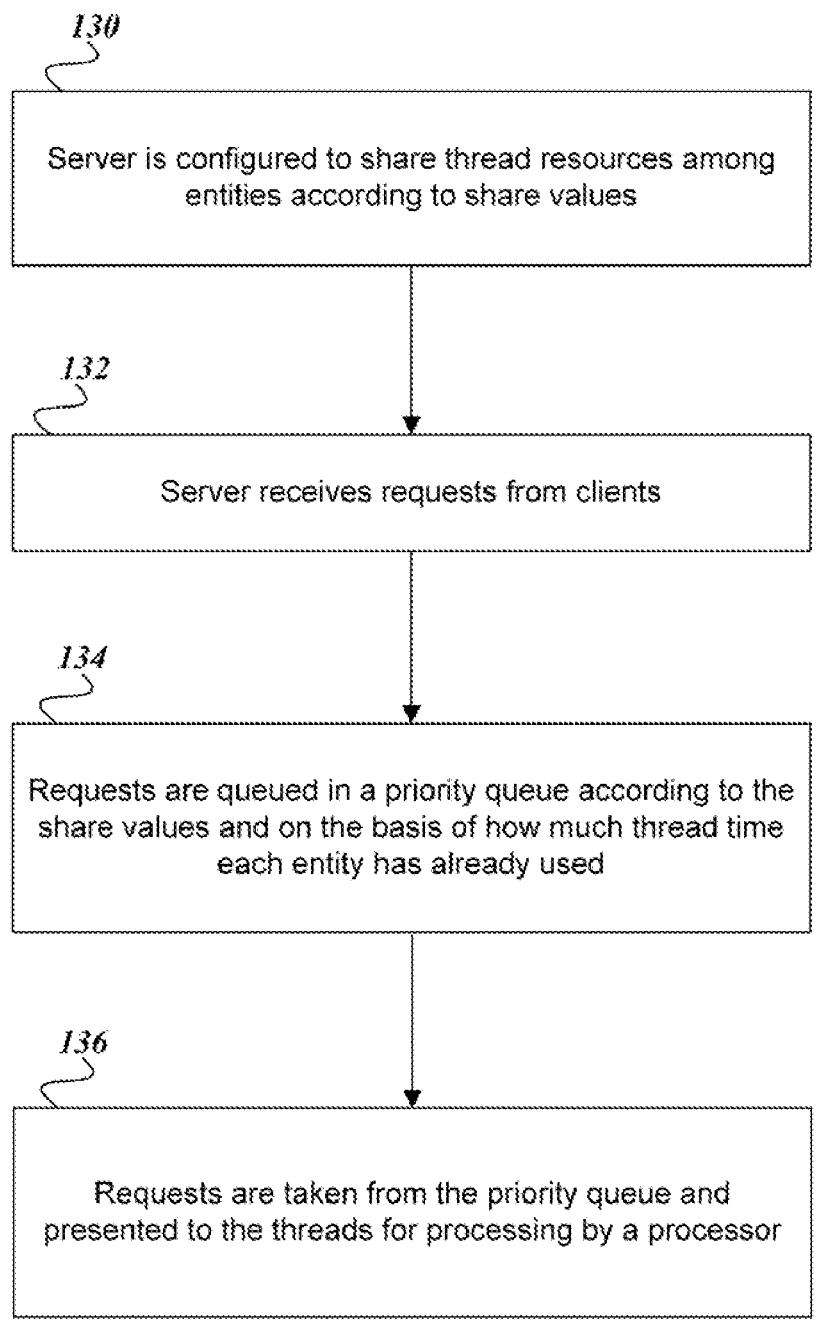
FIG. 3 shows a flow chart for a process of accessing a server using threads, in accordance with an embodiment of the invention.

FIG. 3 shows a flow chart for a process of accessing a server using threads, in accordance with an embodiment of the invention. As shown in FIG. 3, in step 130, the server is configured to share thread resources among entities according to share values. This may be through a console application in which an administrator enters share values numerically or through some other type of device. In step 132, the server receives requests from clients. In step 134 the requests are queued in a priority queue according to the share values and on the basis of how much thread time each entity has already used. In step 136 requests are taken from the priority queue and presented to the threads for processing by a processor.

Implementation Details

Performance engineers and application administrators are the primary users of these features. An administrator states scheduling objectives of an application like the fair share and response time goals. As used within the context of this section, the following definitions are used:

Constrained work set—Work can be grouped based on the resources they share. The performance of all work in this set is constrained by the capacity of the shared resource.

Entry point—Examples include RMI method descriptor, HTTP URI, MDBs, and JCA 1.5 WorkManager instance.

Fair share—An entitlement to use threads. When service classes compete for threads they will be allocated threads in proportion to their respective shares. This proportion is realized only as an average for sufficiently long periods during which the service classes compete. All threads may be allocated to a service class if no others are active.

Self-tuning—The ability of the server to automatically set low level kernel parameters. Administrators can define application requirements they understand, e.g., response time goals, and the server will tune its low-level parameters accordingly.

Response time goal—A goal for the maximum number of milliseconds that can elapse between a request arriving at an entry point in the server and a response being sent out.

Service class—A service class groups work in the server. Objectives are expressed and tracked for a service class, not individual requests. The system should be able to determine the service class of a request before it is enqueued. Some useful service classes arise by grouping according to: entry point, J2EE module, transaction name, current user, or some designated work area field.

Scheduling policy—Determines the wait duration of a request based on its service class and requests from competing service classes.

Workload Management

This feature describes how the server schedules work using service classes, constraints, and the observed load condition in the server. The server permits different scheduling policies for the various classes of work enqueued in the priority queue. This is possible by specifying a service class with the submitted work. This feature lets the system schedule high priority work before less important work even when the high priority work arrives later. During periods of contention the number of threads serving a given service class depends on its stated objective. Constraints define how the kernel should handle work during deadlocks and overload conditions.

Automatic Thread Count Tuning

The server automatically adjusts its thread count striving for maximum throughput and implementing minimum concurrency guarantees. Parameters like threadsIncrease or threadsMaximum are no longer needed.

Reduce Execute Queues Created on Startup

In traditional implementations, subsystems create execute queues of their own for various reasons like deadlock prevention, minimum threads guarantee etc. Self-tuning obviates the need to create multiple execute queues and meet those requirements using service classes and constraints.

Overload Protection

Overload protection protects the server from degradation of service under heavy load. In an overloaded condition the server rejects requests in a configurable way. Administrators are able to specify a threshold queue length after which the server may reject requests. Bursts of low priority requests are most likely to get rejected. They can also specify more specific thresholds for individual service classes.

JCA 1.5 WorkManager

JCA 1.5 WorkManager API provides a way for an adapter to schedule work in a server. This API exposes the thread scheduling functionality. Applications can use the WorkManager API to execute work asynchronously and receive notifications on the execution status.

Workload Management Functional Description

Administrators may define scheduling policies to state special objectives and may express constraints, as shown in the example below:

---

```
<response-time-dispatch-policy name="Shopping" goal-ms="2000" />
<fair-share-dispatch-policy name="GuestShare" percent="1" />
<context-dispatch-policy name="ContextShopping" >
    <case context="subject" value="anonymous" policy="GuestShare" />
    <case context="role" value="BigSpender" policy="Shopping" />
</context-dispatch-policy>
<!-- This configuration tracks the max-processes value of the
    apache web server that faces the extranet -->
<min-threads-constraint name="minThreadsForPluginMaxProcesses"
    count="10" />
```

---

Deployment descriptors and RMI descriptors can then refer to names like ContextShopping and min ThreadsForPluginMaxProcesses to apply them to entry points.

Fair shares are reflected in scheduling logic such that as long as multiple service classes compete, the average number of threads used by each is in proportion to their fair share. For example, consider a situation in which there are only two service classes, A and B, having a fair share of 80 and 20, respectively. During a period in which both service classes are sufficiently requested, say, zero think time and more clients than threads, the probability that a thread will work on behalf of A or B will tend toward 80% or 20%, respectively. The scheduling logic ensures this even when A tends to use a thread for much longer than B.

Response time goals can differentiate service classes. The system does not try to meet a response time goal for an individual request. Rather it computes a tolerable waiting time for a service class by subtracting the observed average thread use time. Then it can schedule requests so that the average wait for each service class is in proportion to their tolerable waiting time. For example, consider there are only two service classes, A and B, with response time goals 2000 ms and 5000 ms, respectively, where the time an individual request uses a thread is much smaller. During a period in which both service classes are sufficiently requested, say, zero think time and more clients than threads, the system can schedule to keep the average response time in the ratio 2:5 so that it is a common fraction or multiple of the stated goal.

An understanding of the scheduling implementation is helpful for an understanding of the scheduling policies. Each service class has an increment and can enter requests in an event queue with virtual time stamps spaced apart by its interval. A high priority is implemented by small increments. The scheduling policies can be explained as follows:

ResponseTime

With attribute, goal-ms, in milliseconds. The increment is $$((goal-T)Cr)/R$$

where T is the average thread use time, R the arrival rate, and Cr a coefficient to prioritize response time goals over fair shares.

Fair Share

With attribute percentage of default share. Therefore, the default is 100. The increment is $$Cf/(PRT)$$

where P is the percentage, R the arrival rate, T the average thread use time, and Cf a coefficient for fair shares to prioritize them lower than response time goals.

Context

With multiple cases mapping contextual information, like current user or its role, cookie, or work area fields to named service classes.

SubordinateStepResponseTime

With attribute, primary, which names a PrimaryStepResponseTime.

PrimaryStepResponseTime

With attribute, goal-ms, in milliseconds. Increment is computed similarly to response time goal. Use the ratio of subordinate steps to primary step and subtract that many average thread uses of the subordinate steps to obtain tolerable wait. Divide the tolerable wait by arrival rate for all steps, primary plus subordinate, and multiply by response time coefficient.

Fixed Increment

With attribute increment.

The fair share coefficient is chosen to be about 1000 times the largest product of arrival rate and average thread use time. The response time coefficient is chosen so that the average increment of response time policies is only one tenth of the average increment of fair share policies.

Constraints

Constraints can be defined and applied to sets of entry points, which are referred to herein as a constrained work set.

Max-Threads

Limits the number of concurrent threads executing requests from the constrained work set. The default is unlimited. For example, consider a constraint defined with maximum threads of 10 and shared by 3 entry points. The scheduling logic ensures that not more than 10 threads are executing requests from the three entry points combined.

Min-Threads

Guarantees a number of threads the server will allocate to requests of the constrained work set to avoid deadlocks. The default is zero. A min-threads value of one is useful, for example, for a replication update request, which is called synchronously from a peer.

Capacity

The server starts rejecting requests only when the capacity is reached. The default is zero. Note that the capacity includes all requests, queued or executing, from the constrained work set. This constraint is primarily intended for subsystems like JMS, which do their own flow control. This constraint is independent of the global queue threshold.

Different scheduling policies and constraints interact as follows:

Above, it was explained that scheduling policy can be based on fair share and response time by relating the scheduling to other work using the same policy. A mix of fair share and response time policies is scheduled with a marked bias in favor of response time scheduling.

A min threads constraint does not increase a fair share. It matters only for an almost deadlocked server. Then, however, it will trump it in the sense that the system schedules a request from a min threads constrained work set even if its service class has gotten more than its fair share recently.

A max threads constraint might, but does not necessarily, prevent a service class from taking its fair share or meeting its response time goal. Once the maximum threads constraint is reached the server will not schedule requests of this constraint type until the number of concurrent executions falls below the limit. The server will then schedule work based on the fair share or response time goal.

The admin_rmi and admin_html queue requirement can be addressed by a min threads constraint and a default fair share. The System queue requirement is also met by a minimum threads constraint. The multicast queue requirement is met by setting max threads equals min threads equals one. This ensures that there is only one thread that is processing multicast requests thus guaranteeing ordering.

Functional Requirements

Dispatch policies and constraints can be defined at three levels: globally in config.xml, per application in weblogic-application.xml, or for specific J2EE modules in weblogic deployment descriptors, weblogic-ejb-jar.xml and weblogic.xml. These names can be used from the corresponding tags dispatch-policy, max-threads, and min-threads. The max-threads and min-threads tags take a value that is either a name of a max-threads-constraint or min-threads-constraint, respectively, or a number. In weblogic-application.xml these tags specify an application wide default. In weblogic.xml and weblogic-ejb-jar.xml they specify a component wide default at the top level. In weblogic.xml mappings are allowed analogous to the filter-mapping of the web.xml, where named dispatch-policy, max-threads, or min-threads are mapped for url-patterns or servlet names. The max-threads-mapping and min-threads-mapping also tolerate numeric values. In weblogic-ejb-jar.xml the value of the existing dispatch-policy tag under weblogic-enterprise-bean can be a named dispatch-policy. For backwards compatibility, it can also name an ExecuteQueue. In addition, the system can allow dispatch-policy, max-threads, and min-threads, to specify named (or unnamed with numeric value for constraints) policy and constraints for a list of methods, analogously to the present isolation-level tag.

The following is an example from a weblogic-application.xml

```
<weblogic-application>
    ...
    <response-time-dispatch-policy>
        <name>TradeExecution</name>
        <goal-ms>3000</goal-ms>
    </response-time-dispatch-policy>
    <fair-share-dispatch-policy>
        <name>Enquiry</name>
        <percent>30</percent>
    </fair-share-dispatch-policy>
    ...
    <max-threads-constraint>
        <name>TradeDB</name>
        <count>db.pool.trade</count>
    </max-threads-constraint>
    <max-threads-constraint>
        <name>CustomerInfoDB</name>
        <count>db.pool.crm</count>
    </max-threads-constraint>
</weblogic-application>
```

The following is an example from a RMI descriptor that defines service classes at component level:

```
<method name="getStockQuote(String)"
    transactional="false"
    dispatch-policy="Enquiry"
    max-threads="10" >
</method>
<method
    name="sellStock(String, int)"
    dispatch-policy="TradeExecution"
    max-threads="TradeDB"
    transactional="true">
</method>
<method
    name="getHomePhone(int)"
    dispatch-policy="Enquiry"
    max-threads="CustomerInfoDB"
    transactional="false">
</method>
```

The max-threads value can be a number, a named max-threads-constraint, or a named connection pool (JDBC or JCA). If the resource size is dynamic the associated min or max threads constraint will also be dynamic and changes as the resource size changes.

Automatic Thread Count Tuning Functional Description

The thread pool serving the priority queue changes its size automatically to maximize throughput. Administrators no longer need to specify ExecuteQueueMBean attributes like threadsIncrease and threadsMaximum. The priority queue monitors the throughput every 2 seconds and uses the collected data to determine if thread count needs to be changed. For example, if more threads gave a better throughput in the past, the server will increase the thread count. Similarly, if less number of threads gave the same throughput in the past, the server will reduce the thread count.

Functional Requirements

No user input is necessary. The server bases the thread count entirely on the throughput history and queue size.

Reduce Execute Queues Created on Startup Functional Description

Collapse the different execute queues into a single priority queue. In the past, it was necessary create different execute queues to prevent deadlocks(admin_rmi, non-blocking), prioritize work(system) and achieve ordering (multicast). These requirements are met by associating a service class with enqueued work. All work can be submitted to the priority queue and the thread usage time is based on the types of service classes that are present in the queue.

Functional Requirements

The following table explains how the existing execute queues can be mapped to service classes and constraints.

```
Execute queue fair-share(1-100) response-time-goal min-threads
    max-threads
weblogic.kernel.System 50 None 5 No restriction
weblogic.admin.HTTP 50 None 2 No restriction
weblogic.admin.RMI 50 None 3 No restriction
weblogic.kernel.Non-Blocking 50 None 5 No restriction
JmsDispatcher 50 None 15 No restriction
Multicast 80 None 1 1
```

Overload Protection Functional Description

Administrators can configure an overload threshold after which the server starts throttling requests. Throttling is done as follows:

The server rejects requests starting from lower order fair shares with no minimum threads constraint set. Service classes with high priorities or those with minimum threads constraint are still accepted.

If the overload condition continues to prevail, higher priority requests will also be rejected since the server is unable to recover from the overload condition. Requests with minimum threads constraint and administration requests will still be accepted.

A well defined error response is sent if work is rejected. A "503: server is busy" error is sent for HTTP and a remote exception is thrown for RMI which would enable the cluster aware client to failover.

Functional Requirements

Queue limits can be specified at the global level or per class of work. The global threshold can be exposed as a KernelMBean attribute. A class of work can define a threshold using the capacity element in Constraints. Here is an example on how to set the capacity element:

```
<weblogic-application>
    ...
    <capacity-constraint>
        <name>myConstraint</name>
        <treshold>5000</treshold>
    </capacity-constraint>
</weblogic-application>
<method
    name="*"
    constraints="myConstraint"
```

-continued

```
    transactional="false">
</method>
```

A capacity constraint overrides the global threshold. This means that the server will continue to accept requests even when the global threshold is reached. Work will be rejected only with the capacity constraint is reached. This is useful for subsystems that perform their own flow control and cannot use the global queue threshold.

HTTP Overload Actions

The system will send a 503 error code if the server is in a cluster. This will allow the plugin to failover. If the server does not belong to a cluster, the system can allow customers to configure an error JSP that will be used as the overload response. Customers can also redirect requests to another server during the overload period by specifying redirection as the overload action.

RMI Overload Actions

If the server is in a cluster, the system throws a ServerOverloadedException, which is a subclass of RemoteException. The client will interpret this as a recoverable exception and fail over to another cluster node. In a non-clustered scenario, customers can specify an alternate server for redirection. RMI requests during the overload period will be redirected to the alternate server.

The server will not use a reader thread to send out the rejection responses. Writing a response involves I/O which can be slow. Using a reader thread to write the response can block all the reader threads preventing incoming socket muxing.

Subsystems can register with the kernel for overload notifications. The kernel will notify its listeners when the global queue threshold is exceeded. This notification can be used to throttle back work at the subsystem level.

Functional Requirements

WorkManagers can be app-scoped or global. An app-scoped WorkManager can be defined in the weblogic-application.xml like the following:

```
<weblogic-application>
    ...
    <workmanager name="myWM">
        <fair-share>30</fair-share>
        <min-threads>5</min-threads>
        <max-threads>25</max-threads>
        <capacity>5000</capacity>
    </workmanager>
    ...
</weblogic-application>
```

To access the WorkManager from the application, one would look up its name in the local environment (java:comp/env). For example:

```
javax.resource.spi.work.WorkManager wm =
    (javax.resource.spi.work.WorkManager)
    ctx.lookup("java:comp/env/myWM");
wm.doWork(work);
```

The system does not create a thread group for each WorkManager definition. All WorkManager instances share the default queue. They get priorities based on their fair-share or response-time-goal.

The present invention may be conveniently implemented using a conventional general purpose or a specialized digital computer or microprocessor programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a computer readable storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for self-tuned threading model in an application server, comprising:
    a server, including one or more processors, which receives requests from clients or other servers for execution by service classes at the server;
    a plurality of threads operating at the server for use in processing the requests;
    a priority queue operating at the server for storing the requests until the requests can be processed by the threads;
    a configuration file, which defines a plurality of service classes executing at the server to which each of the requests can be directed, wherein the configuration file includes numeric share values associated with the plurality of service classes, including a share value for each service class, and wherein each of the share values represents a proportional entitlement to thread usage for its associated service class as compared to other service classes having other share values;
    a software process that operates on the server and maintains the priority queue for allocating threads to requests, according to the service class to which the requests are directed and the proportional entitlement priority to thread usage for each service class, including
    determining that service class to which a received request is directed,
    determining the share value associated with that service class, and
    placing that request in the priority queue in proportion to the share value for each request's service class, so that the threads are provided with requests for each service class in a ratio matching those service classes proportional entitlement; and
    wherein one or more numeric share values associated with the plurality of service classes and defined in the configuration file can be modified, to reflect a different proportional entitlement, and wherein the software process automatically modifies the placement of subsequent received requests in the priority queue, to reflect the different proportional entitlement.

2. The system of claim 1 wherein said server includes multiple processors.

3. The system of claim 1 wherein the entries are queued in the priority queue according to pro-rata time values.

4. The system of claim 3 wherein the entries are queued according to the calculated thread usage time already used in comparison to the time values.

5. The system of claim 1 wherein the entries may be queued according to additional configured constraints.

6. The system of claim 5 wherein the constraints are determined by queuing the entry in an additional constraints queue.

7. The system of claim 1 wherein the placing of the request in the priority queue and presenting to the threads the request with a priority in proportion to the share value further comprises
    lowering the priority by an amount proportional to amount of threads and thread time already used by the client making the request, and raising or lowering by an amount related to the response time goal.

8. A method for self-tuned threading model in an application server, comprising the steps of:
    configuring the server to share thread resources among entities according to share values;
    receiving requests at the server from clients or other servers for execution by service classes at the server;
    determining a plurality of service classes to which each requests can be directed, wherein a configuration file includes numeric share values associated with the plurality of service classes, including a share value for each service class, and wherein each of the share values represents a proportional entitlement to thread usage for its associated service class as compared to other service classes having other share values;
    queuing requests in a priority queue in proportion to the share value for each requests' service class;
    maintaining the priority queue for allocating threads to requests, according to the service class to which the requests are directed and the proportional entitlement priority to thread usage for each service class; and
    taking the requests from the priority queue and presenting the requests to the threads for processing by a processor, wherein for each request the method further comprises
    determining that service class to which a received request is directed,
    determining the share value associated with that service class, and
    placing that request in the priority queue in proportion to the share value for each request's service class, so that the threads are provided with requests for each service class in a ratio matching those service classes proportional entitlement; and
    wherein one or more numeric share values associated with the plurality of service classes and defined in the configuration file can be modified, to reflect a different proportional entitlement, and wherein the software process automatically modifies the placement of subsequent received requests in the priority queue, to reflect the different proportional entitlement.

9. The method of claim 8 wherein said sewer includes multiple processors.

10. The method of claim 8 wherein the entries are queued in the priority queue according to pro-rata time values.

11. The method of claim 10 wherein the entries are queued according to the calculated thread usage time already used in comparison to the time values.

12. The method of claim 8 wherein the entries may be queued according to additional configured constraints.

13. The method of claim 12 wherein the constraints are determined by queuing the entry in an additional constraints queue.

14. The method of claim 8 wherein the placing of the request in the priority queue and presenting to the threads the request with a priority in proportion to the share value further comprises lowering the priority by an amount proportional to amount of threads and thread time already used by the client making the request, and raising or lowering by an amount related to the response time goal.

15. A computer readable storage medium, including instructions thereon which when executed cause the computer to perform the steps of:

configuring the server to share thread resources among entities according to share values;

receiving requests at the sewer from clients or other servers for execution by service classes at the server;

determining a plurality of service classes to which each requests can be directed, wherein a configuration file includes numeric share values associated with the plurality of service classes, including a share value for each service class, and wherein each of the share values represents a proportional entitlement to thread usage for its associated service class as compared to other service classes having other share values;

queuing requests in a priority queue in proportion to the share value for each requests' service class;

maintaining the priority queue for allocating threads to requests, according to the service class to which the requests are directed and the proportional entitlement priority to thread usage for each service class; and taking the requests from the priority queue and presenting the requests to the threads for processing by a processor, wherein for each request the method further comprises determining that service class to which a received request is directed, determining the share value associated with that service class, and placing that request in the priority queue in proportion to the share value for each request's service class, so that the threads are provided with requests for each service class in a ratio matching those service classes proportional entitlement; and wherein one or more numeric share values associated with the plurality of service classes and defined in the configuration file can be modified, to reflect a different proportional entitlement, and wherein the software process automatically modifies the placement of subsequent received requests in the priority queue, to reflect the different proportional entitlement.

16. The computer readable storage medium of claim 15 wherein said server includes multiple processors.

17. The computer readable storage medium of claim 15 wherein the entries are queued in the priority queue according to pro-rata time values.

18. The computer readable storage medium of claim 17 wherein the entries are queued according to the calculated thread usage time already used in comparison to the time values.

19. The computer readable storage medium of claim 15 wherein the entries may be queued according to additional configured constraints.

20. The computer readable storage medium of claim 19 wherein the constraints are determined by queuing the entry in an additional constraints queue.

21. The computer readable storage medium of claim 15 wherein the placing of the request in the priority queue and presenting to the threads the request with a priority in proportion to the share value further comprises lowering the priority by an amount proportional to amount of threads and thread time already used by the client making the request, and raising or lowering by an amount related to the response time goal.

* * * * *

UNITED STATES PATENT AND TRADEMARK OFFICE
CERTIFICATE OF CORRECTION

| | | |
|---|---|---|
| PATENT NO. | : 7,657,892 B2 | Page 1 of 1 |
| APPLICATION NO. | : 11/132601 | |
| DATED | : February 2, 2010 | |
| INVENTOR(S) | : Anno Langen et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 833 days.

In column 1, line 4, below "MODEL"
insert -- Copyright Notice A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. --.

In column 13, line 3, in claim 9, delete "sewer" and insert -- server --, therefor.

In column 13, line 28, in claim 15, delete "sewer" and insert -- server --, therefor.

Signed and Sealed this

Thirtieth Day of November, 2010

David J. Kappos
*Director of the United States Patent and Trademark Office*